March 29, 1932. J. R. THORP 1,851,141
TIRE LOCK
Filed June 30, 1930

Inventor
J. R. Thorp
by W. H. Lieber
Attorney

Patented Mar. 29, 1932

1,851,141

UNITED STATES PATENT OFFICE

JOEL R. THORP, OF WEST ALLIS, WISCONSIN, ASSIGNOR TO THE FULTON COMPANY, OF WEST ALLIS, WISCONSIN, A CORPORATION OF WISCONSIN

TIRE LOCK

Application filed June 30, 1930. Serial No. 464,766.

The present invention relates in general to improvements in the construction and operation of devices for preventing unauthorized removal of parts such as the spare tires of automobiles or the like, which are customarily supported upon tire carriers at the rear of the vehicles.

An object of the invention is to provide an improved tire lock which is simple, compact and rigid in construction, and which is also highly efficient in operation.

It has heretofore been proposed, as specifically illustrated in United States Patent No. 1,339,075, granted May 4, 1920, to provide a tire lock for a spare tire mounted at the rear of a vehicle, consisting of a casing for housing a clamping nut and having an opening for permitting access to the nut, and a removable cap for normally sealing the casing opening. In this prior locking structure, the cap is retained in place upon the casing, by means of a mechanism including a key operable cylinder and crank pin, the operating portion of which is exposed to the rear of the cap which is associated with the extreme rear portion of the casing and of the vehicle. The disposition of the elements is such, that the key operable portion of the cylinder is constantly exposed to the danger of being damaged by impact from an approaching vehicle, to such an extent that the lock cannot be manipulated even with the aid of its key. The construction of the casing, closure cap, and locking mechanism of the prior locking devices of this kind, is moreover such, that the locking mechanism is not sufficiently protected and cannot be conveniently manipulated to permit removal and attachment of the closure cap, and that the entire structure is insufficiently rigid and secure to serve its contemplated purpose.

A more specific object of the present invention is to provide various improvements in the details of construction and in the mode of operating spare tire locking devices of the general type disclosed in the said patent, whereby the defects of such prior structures, are substantially eliminated. The present improved locking structure provides maximum protection for the key operable cylinder, preventing possible damaging thereof due to bumping of the rear closure cap by another car, and also protecting the key hole against entry of dirt and water. The present invention also contemplates improvements in the formation of the closure cap whereby the same may be conveniently applied, and subsequently removed with the aid of its key, but not otherwise. The improvement further contemplates provision of an extremely compact and rigid spare tire lock which may be manufactured at minimum cost, and which presents a neat appearance. These and other objects and advantages of the invention will appear from the following detailed description.

A clear conception of an embodiment of the invention and of the mode of constructing and of manipulating tire locks built in accordance therewith, may be had by referring to the drawings accompanying and forming a part of this specification in which like reference characters designate the same or similar parts in the several views.

Figure 4:
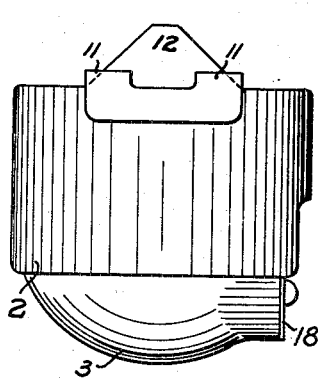
Fig. 4 is a top view of the improved spare tire locking device.

The improved spare tire locking device specifically shown in the drawings by way of illustration, comprises in general a main casing 2 having a restricted front opening 20 adapted for the reception of the rearwardly extending threaded end of a fixed clamping bolt 7 and also having an enlarged rear opening for permitting access to a clamping nut 8 coacting with the threaded rear end of the bolt 7 within the casing 2; a closure cap 3 for sealing the rear opening of the casing 2; and locking mechanism for retaining the cap 3 in position upon the casing 2.

The main casing 2 is preferably of cylindrical formation, and the front upper portion of this casing is provided with several contact lugs 11 adapted to coact with the rear upper portion of the bottom part of an annular tire carrier 10 associated with the rear of a vehicle. The lower front portion of the casing 2 is formed for clamping coaction with the rear inner portion of the tire supporting rim 9 mounted upon the carrier 10, and has a tapered holding cleat 12 formed for disposition between the carrier 10 and the rim 9. The spare tire 21 carried by the rim 9, is of usual construction, being provided with an inner tube having a valve stem which penetrates the rim 9. The rear casing opening 20 is preferably vertically elongated so as to permit the casing 2 to assume proper clamping position relative to the tire carrier 10 and the rim 9 without obstruction by the clamping bolt 7, and the bolt 7 may be rigidly attached to the carrier 10 in any suitable manner.

The rear portion of the main casing 2 is provided with an annular end socket 19 formed to receive the peripheral edge of the closure cap 3 so as to prevent the cap from being pried from the casing by insertion of a sharp implement thereunder. The interior of the casing 2 is provided with an abutment 15 which is preferably of annular formation in order to permit accurate machining thereof with a tool revolving about the central casing axis. The casing 2 may be formed of cast metal and the exterior thereof may be neatly finished by enameling or otherwise.

Figure 1:
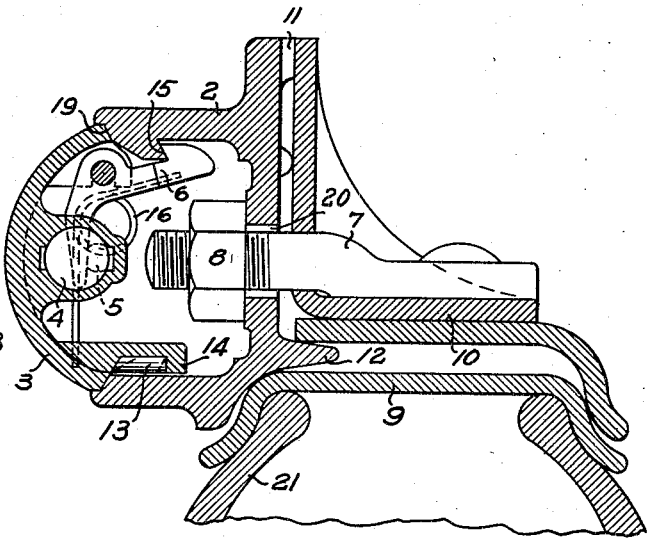
Fig. 1 is a central vertical section through one of the improved spare tire locks, showing the same applied to clamp a spare tire upon its support.
Figure 3:
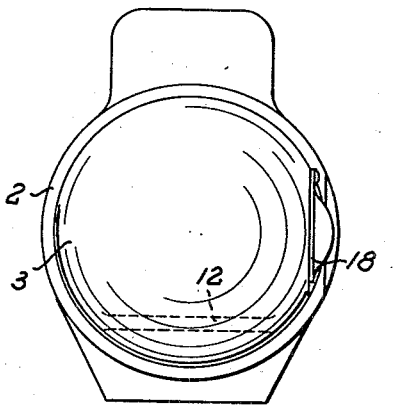
Fig. 3 is a rear view of the improved spare tire locking device.
Figure 2:
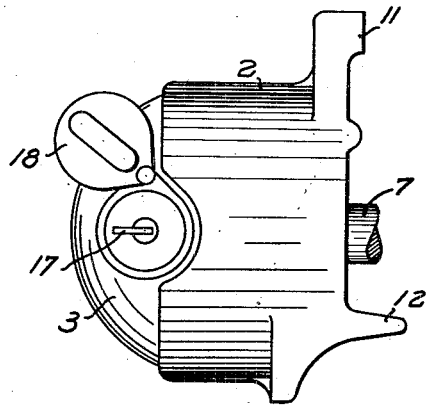
Fig. 2 is a side elevation of the improved spare tire locking device.
Figure 5:
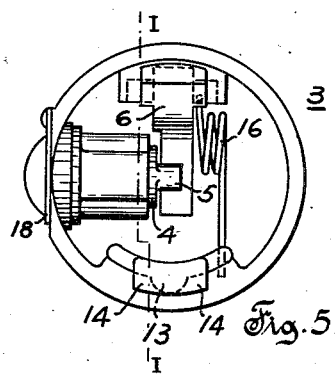
Fig. 5 is an internal view of the closure cap of the improved tire locking device.

The closure cap 3 may be formed as a die casting with its exterior plated and polished, and comprises a shell of substantially spherical form, bulging rearwardly away from the casing 2. The cap 3 constitutes a support for the locking mechanism which comprises a key operable cylinder 4 having a key hole 17 exposed to the exterior of the cap 3, and also having a crank pin 5; a latch 6 pivotally supported upon the cap 3 and movable by the crank pin 5; and a coil spring 16 secured to the casing 3 and cooperating with the latch 6 to constantly urge the locking hook of the latch away from the cap axis. The key hole 17 of the lock cylinder is accessible only from the side of the casing 2 and cap 3, and may be concealed by means of a pivoted shield 18 as shown in Figs. 2 and 3. The lock cylinder 4 is disposed within a bore extending transversely of the cap axis, and may be locked within this bore in any suitable manner. The latch hook is adapted to engage the casing abutment 15 as shown in Fig. 1, and the portion of the cap 3 remote from the latch 6 is provided with a positioning projection 13 and with retaining projections 14 which are also cooperable with the abutment 15.

When the cap 3 is locked to the casing 2, the clamping nut 8 is completely concealed, and the cap 3 can only be removed with the aid of the key. The cap 3 cannot be pried loose, and the outwardly convex formation of this cap serves to deflect any object impinging against the rear thereof. The disposition of the lock cylinder transversely of the cap axis, prevents damaging of the cylinder 4 and the key hole 17 by impact from an approaching vehicle, and also protects the key hole from dirt and water splashing against the locking device. The latch 6 is held in firm engagement with the abutment 15 by the spring 16, and the projections 14 likewise firmly engage the abutment 15 at the opposite side of the casing 2.

When the releasing key is applied and the cylinder 4 turned within its confining bore, the crank pin 5 becomes effective to retract the latch 6 from the abutment 15, against the action of the coil spring 16, thus permitting free removal of the projections 14 from the abutment 15, and subsequent withdrawal of the cap 3. The clamping nut 8 may then be readily manipulated and the casing 2 removed if desired whereupon the spare rim 9 and tire 21 are freely removable from the carrier 10. The closure cap 3 may however, be applied to the casing 2, without the aid of the key, by merely inserting the projection 13 in the groove provided in the casing 2 in order to properly position the cap 3, and by subsequently snapping the cap 3 in place. The formation of the end of the latch 6 and of the casing 2, is such as to permit the latch to readily slip past the adjacent abutment 15, the spring 16 being compressed during passage of the latch over the abutment and serving to automatically snap the latch into locking position when the parts are properly assembled.

From the foregoing description, it will be apparent that the improvement provides a tire lock which is simple, compact and rigid in construction, and which is moreover highly efficient in operation. The cap 3 may be conveniently applied to or removed from the casing 2, and all parts are effectively protected against damage. The device may be applied to most standard automobiles wherein the spare tire is mounted at the rear of the vehicle, and has proven extremely satisfactory in commercial operation.

It should be understood that it is not intended to limit the invention to the exact details of construction and to the precise mode of operating locking devices, herein shown and described, for various modifications within the scope of the claims may occur to persons skilled in the art.

It is claimed and desired to secure by Letters Patent:

1. The combination with a horizontally disposed retaining bolt for spare tires having a retaining nut thereon, of a casing having an annular wall adapted to surround said nut and the end of said bolt and also having an integral end portion formed to engage said nut and the tire rim when the latter is locked in place, the opposite end of said wall having a side recess and being provided with a tapered seating extending around said end and terminating at said recess, a cap engageable with said tapered seating and having a horizontal bore disposable within said recess, a latch pivotally supported by said cap and cooperable with an abutment on the interior of said wall, and a cylinder lock for actuating said latch located in said bore and manipulable from the recessed side of said casing.

2. The combination with a horizontally disposed retaining bolt for spare tires having a retaining nut thereon, of a casing having an annular wall adapted to surround said nut and the end of said bolt and also having an integral end portion formed to engage said nut and the tire rim when the latter is locked in place, the opposite end of said wall having a side recess and being provided with a tapered seating extending around said end and terminating at said recess, a cap engageable with said tapered seating and having a horizontal bore disposable within said recess, a latch pivotally supported by said cap and cooperable with an abutment on the interior of said wall, a spring carried by said cap for constantly urging said latch toward latching position, and a cylinder lock for actuating said latch located in said bore and manipulable from the recessed side of said casing.

In testimony whereof the signature of the inventor is affixed hereto.

JOEL R. THORP.